July 26, 1966 D. L. SELHOST 3,262,491
SELF-CONTAINED AIR-CONDITIONING UNIT VENTILATOR
Filed Dec. 1, 1964 4 Sheets-Sheet 1
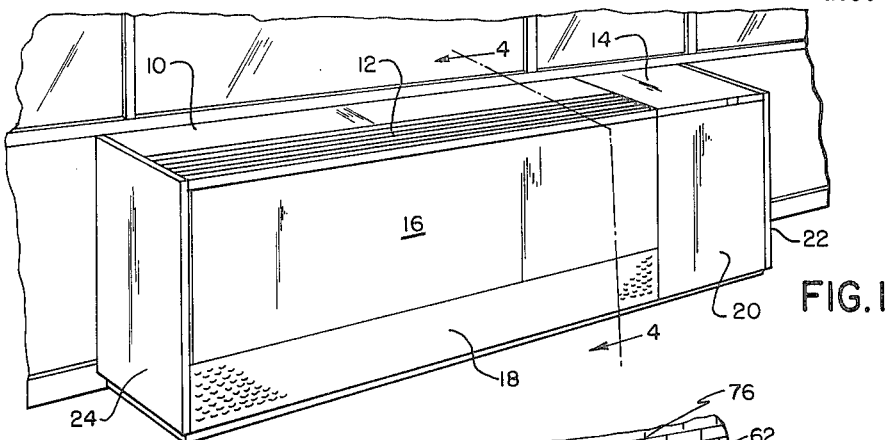
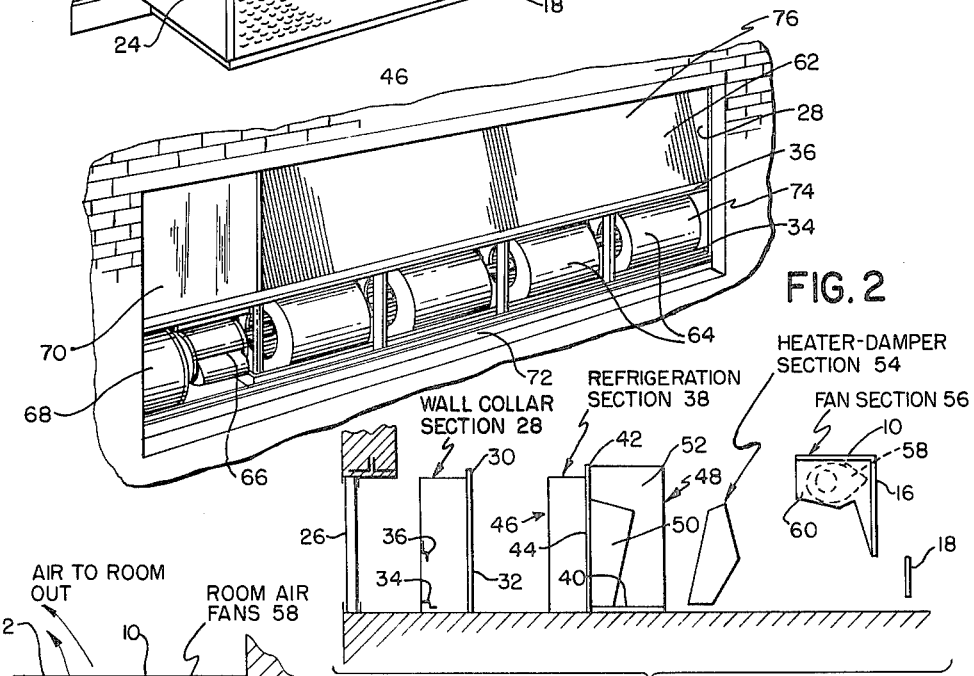
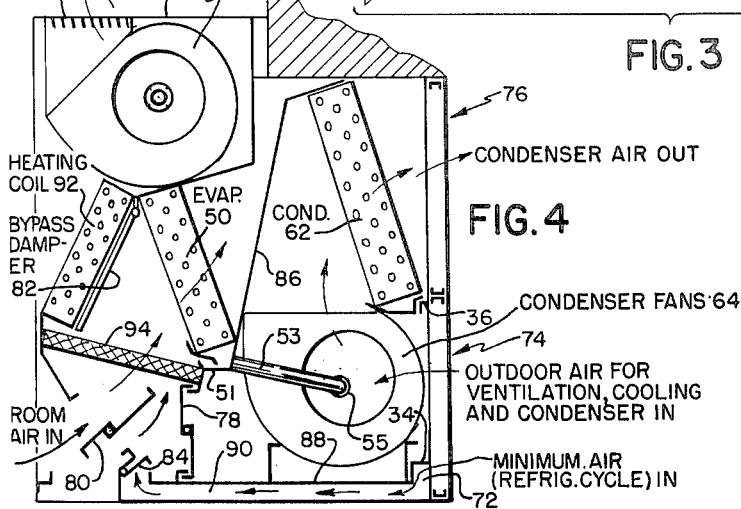
INVENTOR.
DALE L. SELHOST
BY
ATTORNEY July 26, 1966  D. L. SELHOST  3,262,491
SELF-CONTAINED AIR-CONDITIONING UNIT VENTILATOR
Filed Dec. 1, 1964  4 Sheets-Sheet 2

INVENTOR.
DALE L. SELHOST
BY Edward C. Grenz
ATTORNEY

July 26, 1966     D. L. SELHOST     3,262,491
SELF-CONTAINED AIR-CONDITIONING UNIT VENTILATOR
Filed Dec. 1, 1964     4 Sheets-Sheet 3

INVENTOR.
DALE L. SELHOST
BY
Edward C. Grenz
ATTORNEY

United States Patent Office 3,262,491
Patented July 26, 1966

3,262,491
SELF-CONTAINED AIR-CONDITIONING UNIT VENTILATOR
Dale L. Selhost, Rock Island, Ill., assignor to American Air Filter Company, Inc., Louisville, Ky., a corporation of Delaware
Filed Dec. 1, 1964, Ser. No. 415,145
11 Claims. (Cl. 165—16)

This invention relates to a self-contained air-conditioning unit ventilator.

It is generally considered in the art to which this invention pertains that a unit ventilator principally differs from other heating-ventilating-cooling units, in its capability of providing natural or ventilation cooling, i.e., introducing outdoor air up to 100 percent of its rated capacity for purposes of cooling the space which the unit ventilator serves. In addition of course unit ventilators perform the other functions of heating, ventilating, recirculating and filtering air in a "unit" space, and in the case of so-called year-round unit ventilators, provide mechanical cooling of the air by means of a chilled medium passed through the coil.

Unit ventilators are used primarily in school classrooms, and to a lesser degree in meeting rooms and other high density of occupancy spaces and subject to substantial changes in occupancy. It is only in such applications that one can reasonably justify use of a unit ventilator with its capacity for utilizing outdoor air for natural cooling since, as a general rule, it costs a substantial amount to obtain the sophisticated functioning of a unit ventilator.

The so-called year-round unit ventilators in which chilled water is used as the cooling medium to get a mechanical cooling function have been of commercially practical importance for about the last ten years. As far as they go, they perform well. However, there are certain applications which they do not lend themselves to by their very nature. For example, if it is desired to air condition (i.e., provide mechanical cooling for) only one or two or a few classrooms of a large number of classrooms, the economics of the situation will usually preclude, as a practical matter, installing the few year-round unit ventilators, since the installation of apparatus for generating the chilled water may be prohibitively expensive for the relatively few classrooms which are to be mechanically cooled.

Additional examples of the inflexibility under some conditions of the chilled water type of unit ventilator are well known to those skilled in this art. Thus, for example, where a chilled water system is provided, all of the school classrooms must be on the air conditioning cycle if any part of the classrooms are on the air conditioning cycle. The central chilled water plant must be made ready for use before any single classroom or area of the building can utilize mechanical chilled water air conditioning. Further, while the installation of a central chilled water system and piping to the unit ventilators is not unduly expensive in a new building, it is extraordinarily expensive and requires extensive remodeling if it is to be applied to existing buildings.

When the foregoing shortcomings are recognized, and their recognition is coupled with an appreciation of the current school situation with respect to the clamor for greater use of the expensive school buildings, the desirability of providing a unit ventilator which cannot only provide cooling but has greater flexibility than the chilled water type, can be appreciated.

However, recognizing the desirability of providing what may be termed a self-contained air-conditioning unit ventilator, and providing such a device are two quite different things. The requirements which any classrom unit ventilator must meet are substantial and may not be departed from to any substantial extent without incurring penalties. For example, the size and spatial limits of a classroom unit ventilator are effectively limited. For most purposes it is highly desirable that the unit be of the console cabinet type adapted to extend horizontally along the outside wall of the room with a height not greater than the window sill of the room, and preferably no more than the 32 inch height of conventional unit ventilators. Furthermore, the unit is limited in how far it may project out from the wall.

The noise level is of extreme importance in a classroom, and any noise generated by the compressor or fans must not be excessive, or it must be reduced. At the same time, the capacity requirements of a classroom unit ventilator are substantial since it must provide adequate mechanical cooling in the summer, and must have a substantial capacity for natural cooling to offset heat loads arising from students, lights, sun load, and other sources in other seasons.

The unit ventilator must be able to accommodate heat-producing elements of diverse character, such as steam, hot water, or electric resistance elements, since the unit ventilator will sometimes be installed in buildings where steam or hot water, for example, are already available at the location where the unit is to be located. The unit ventilator must be capable of being operated in any one of a number of different control cycles. Different jurisdictions have different requirements as to minimum ventilation for schoolrooms, and the unit must be adapted to be operable in accordance with most of the usual control cycles, using any of the diverse heating elements as well as being operable in a satisfactory cycle for summer cooling.

In certain instances it may be desirable to provide a unit which does not initially include a refrigeration system but is capable of later receiving it without undue installation or unit modification expenses. A somewhat similar requirement is that the unit construction be such that access to the components requiring the most frequent servicing is simple and may be performed by a relatively unskilled person. Further, the unit should be of a character which permits substantial dissassembly in the field or at the job site without undue difficulty to provide major servicing if such major servicing is necessary. In summary then, numerous challenges are posed by such requirements, and what may seem to be, superficially at least, a relatively simple task in providing what is called a self-contained air-conditioning unit ventilator instead results in a formidable task.

The self-contained air-conditioning unit ventilator of the invention, by virtue of its unique construction and arrangement of elements, is believed to eminently meet and satisfy most of the requirements.

The invention will be described in connection with the accompanying drawing in which:

FIGURE 1 is a perspective view illustrating a self-contained air-conditioning unit ventilator according to the invention installed in a typical location along a room outside wall below a window;

FIGURE 2 is a perspective view of the back face of the unit ventilator in installed position as viewed from the outside of the building, and with the usual wall louver removed to provide the exposed view;

FIGURE 3 is an end view, partly in section, showing end views of the sections of the unit ventilator in outline and exploded;

FIGURE 4 is a view in the nature of a vertical section corresponding to one section taken along the line 4—4 of FIG. 1;

Figure 5:
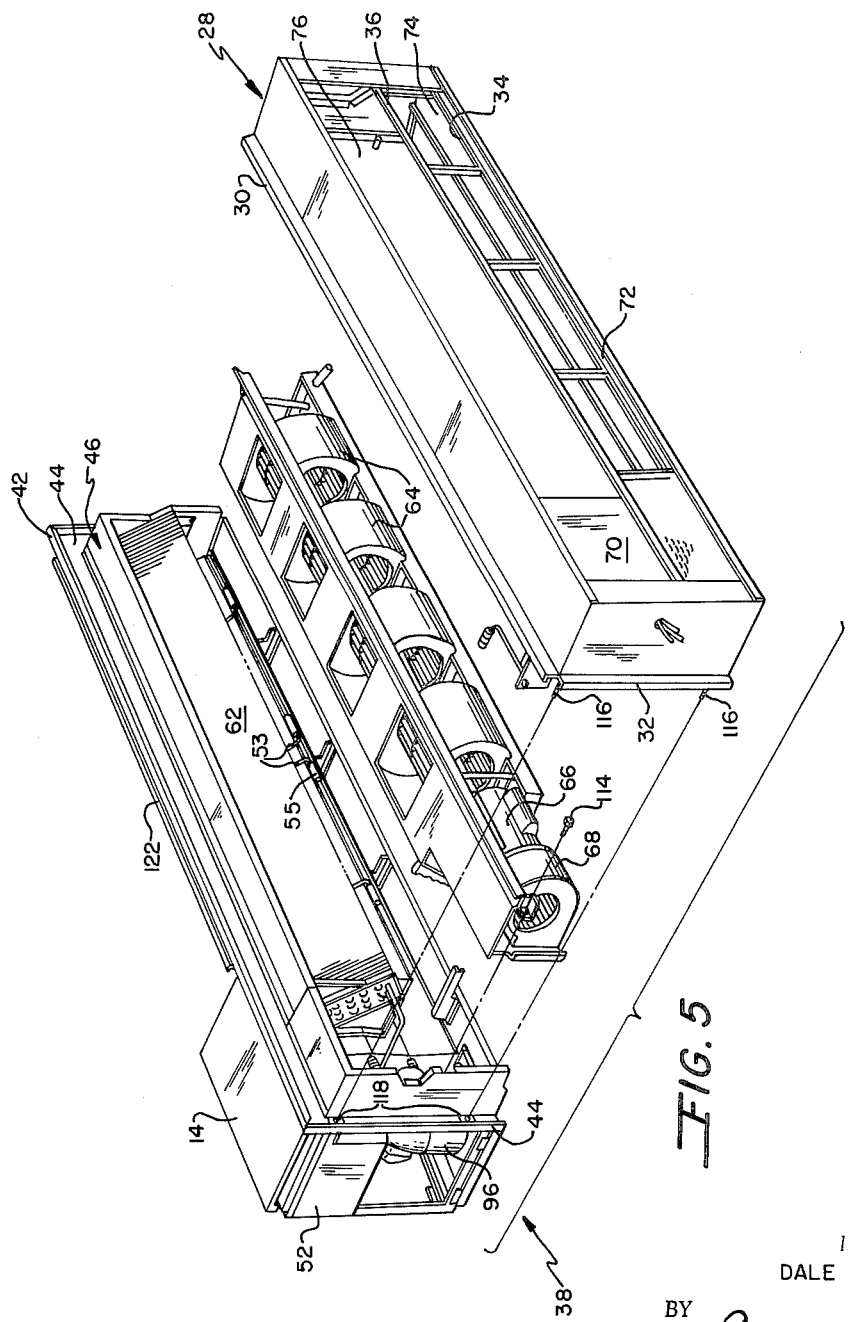
FIGURE 5 is an exploded isometric view from the back of the wall collar section and the refrigeration section with the condenser fans shown in disconnected relation to the back side of the refrigeration section.

Before beginning the detailed description, it is noted that certain shorthand expressions will be used for brevity. Thus, regarding the operating cycles of the unit, winter cycle will mean that the refrigeration section is inoperative, and any cooling effected must be natural cooling through use of outdoor air. Summer cycle will mean that the refrigeration section is operative to furnish mechanical cooling. It will be appreciated that summer and winter cycles are used in the transitional seasons of spring and fall depending upon the temperature.

FIGURE 1 shows a typical installation of a unit ventilator according to the invention. Here the unit is installed in an opening in the outside wall, and below the window, of a room served by the unit ventilator. The exterior cabinet of the unit ventilator is formed of a number of panels including: a main top wall panel 10 having a conditioned air outlet grille 12 along its front; a control access panel 14 at the right end of the unit overlying the control compartment and hinged along its rear edge to facilitate access to the controls; a main front wall panel 16 including a lower front access panel 18 of perforated character to admit room air into the unit for recirculation, this panel being hinged along its lower edge to facilitate access to an air filter; a control and compressor compartment access front panel 20 at the right end of the unit; and end panels 22 and 24 at the respectively opposite ends of the unit.

The generally sectionalized construction according to the invention appears in a number of the views including FIG. 3 where the sections are exploded and shown in the order in which they are installed. In that view a relatively large opening in the exterior wall of the served room is shown with only a weather louver 26 installed therein. Outdoor air for whatever purpose needed is admitted through the louver.

The wall collar section 28 fits immediately in front of the louver 26 and is in the general form of an open-faced rectangular box having front and rear open faces, a top flange 30 and aligned end flanges 32 along the front open face. The outer face of the wall collar section is divided in a vertical direction by a lower horizontally-extending angle member 34, and an upper horizontally extending angle member 36. The purpose of these divisions is to divide the outer face of the wall collar section into distinct portions through which air for different functions is admitted and discharged. The wall collar section is received into the wall opening in recessed fashion with the flanges 30 and 32 seating against the interior face of the wall in the standard installation.

The refrigeration section designated 38 (FIGURE 3) includes a substantial number of operating components which will be explained in more detail hereinafter, and is mounted upon a chassis 40. The refrigeration section includes a top overlap edge 42 and end flanges 44 aligned with the top flange, the overlap and flanges framing the refrigeration section along the top and ends in a plane which generally divides the refrigeration section into a rear-facing portion 46 which is adapted to be recessed within the wall collar section 28, and the front-facing portion 48 which projects out of the front face of the wall collar section when the refrigeration section is nested therewithin. When the refrigeration section is moved into its installed position relative to the wall collar section, the overlap 42 and flanges 44 on the refrigeration section encompass the flanges 30 and 32 of the wall collar section and thus provide a finished edge along the inner face of the room wall. As shown in FIGURE 3, the front-facing portion of the refrigeration section designated 48 includes both an inclined evaporator 50 and a control and compressor compartment space 52.

The heater-damper section 54 has a shape in outline which adapts it to be fitted against the evaporator portion 50 of the refrigeration section. The upper part of the heater-damper section usually includes a heat exchanger adapted to perform a heating function, and the lower portion of the heater-damper section comprises the damper portion which controls the admission and proportioning of air for the room air fans.

The room air fan section 56 is shaped in end outline so as to provide a mating fit with the front portion 48 of the refrigeration section 38, with the main top wall panel 10 of the fan section aligned with the top wall panel 14 of the control compartment, and with the main front wall panel 16 and lower access panel 18 covering the front of the unit. The room air fan section 56 includes a series of parallel room air fans 58 shown in broken line outline form and also includes partitions designated 60 which support the fans and fan motor within the section. The end outline form of FIGURE 3 illustrates generally how the vertical partition means 60 of the room air fan section inter fit with the complementary vertical partition means of the refrigeration section to form compartmentalized spaces which will be later further described.

Before passing to FIGURE 4, which perhaps best shows in schematic form the relationship of the parts in assembled form, the arrangement of parts within the wall opening as viewed from outside the served room is illustrated in FIGURE 2. The weather louvers 26 are omitted from FIGURE 2 so that the rear portion 46 of the refrigeration section in its telescopically received relation within the wall collar section 28 is clearly shown. The principal elements of the rear portion 46 of the refrigeration section exposed in FIGURE 2 include; the air leaving face of the forwardly inclined condenser 62 extending along the upper part of most of the horizontal length of the section, the series of condenser fans 64 on a common shaft underlying the condenser 62 and also extending for substantially the same length as the condenser; the condenser fan drive motor 66, and a separate compressor compartment ventilating fan 68. The rear wall 70 of the compressor compartment is also seen in FIGURE 2.

FIGURE 2 also discloses the cross members 34 and 36 extending across the outer face of the wall collar section to divide the outer face of that collar section into a lower minimum air entry slot 72, a condenser fan air inlet opening generally designated 74, and the upper space designated 76 which is the condenser air outlet. The air which is handled by the ventilating fan 68 is forced into the compressor compartment, exits therefrom into the space upstream from the condenser 62, and merges with the other condenser air.

Attention is now directed to FIGURE 4 which shows the principal components in their assembled relation and with the dampers in a position corresponding to a summer (mechanical cooling) cycle. The dampers include a main outdoor air damper 78, room air damper 80, bypass damper 82, and minimum air auxiliary damper 84.

The main outdoor air damper 78 is shown closing the passage through which outdoor air is usually admitted during the winter operation of the unit. The admission path of the outdoor air is between the condenser fans 64, and then through the opening bounded along the top by the lower edge of the lengthwise partition wall 86 separating the condenser 62 and evaporator 50, and at the bottom by the false bottom wall 88 under which lies the passage 90 for admitting minimum air during the summer cycle.

The room air damper 80 is maintained fully open and the main outdoor air damper 78 fully closed during the summer cycle. To obtain some ventilation for imparting freshness to the air during the summer cycle, the minimum air damper 84 is maintained in a fully-open position permitting approximately 20 percent outdoor air to be induced by the room air fans to enter the unit through the minimum air slot 72, and then pass through the minimum air passage 90 into the damper section. For the winter cycle, the minimum air damper 84 is maintained fully closed, and the main outdoor air damper 78 and room air damper 80 move in modulating fashion in response to temperature variations in the room. To this end, the two dampers 78 and 80 are connected to each other by suitable linkage driving the dampers in inversely related movement under normal conditions. Thus, under usual conditions as the main outdoor air damper 78 moves toward a closed position, the room air damper 80 correspondingly moves toward an open position, and vice versa.

The bypass damper 82, which is disposed in the inverted V formed above the air filter 94 and between the heating coil 92 and the evaporator 50, inclined toward each other as shown, is maintained in a position fully closing off the face of the heating coil during the summer cycle. This is in accordance with preferred practice to avoid freezing the evaporator by restricting air flow through it while continuing to pass refrigerant through it. During the winter cycle the bypass damper 82 is moved in modulating fashion in accordance with room temperature variations as a face and bypass damper with the bypass passage being that one in which the evaporator coil (which is then non-operating) is located.

During both summer and winter cycle operation the room air fans 58 are run continuously during occupied periods of the room and discharge conditioned air through the outlet grille 12. During the summer cycle, the condenser fans 64 are run and draw air for condenser cooling in through the condenser air inlet 74, then direct it upwardly along the rear surface of the partition wall 86 of the refrigeration section, and finally through the condenser 62 and out to atmosphere through the outlet 76. In the winter cycle, the condenser fans are not run.

Condensate which collects upon evaporator 50 during summer cycle operation drains into underlying pan 51. The collected condensate then passes through a series of drain tubes 53 which extend from the pan 51 through the lengthwise-extending partition 86 of the refrigeration section, and have outlets for discharging the condensate into condenser fans 64. One drain tube is provided for each fan and a removable extension 55 is provided for each tube. The tubes, extensions and their arrangement along the rear-facing portion 46 of the refrigeration section is perhaps best shown in FIGURE 5. These extensions 55 conduct the condensate into the eyes of the centrifugal condenser fans so that it will be thrown and carried along with the condenser air to the condenser 62.

The extensions are removable to facilitate the disassembly of the condenser fan section from the refrigeration section.

Figure 8:
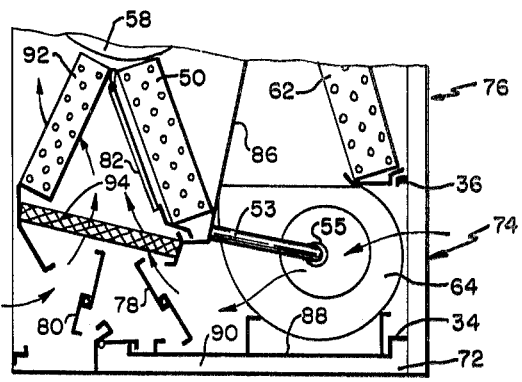
FIGURE 8 is a fragmentary schematic view in the nature of a vertical section illustrating a typical damper position during winter cycle operation.

The winter cycle operation is ordinarily more complex with respect to damper control. However, the end to be achieved by the damper operation is to obtain the proper degree of heating, ventilation, and natural cooling in accordance with one or another of the standard control cycles, and the general way in which this is effected will be described in connection with FIGURES 8 and 9. These views illustrate typical damper positions during winter cycle operation. FIGURE 8 is an example of a damper position corresponding to a minimum percentage of outdoor air being admitted to the unit, and with the heating coil 92 providing substantially full heating to this air and the room air mixed therewith. The auxiliary air damper 84 is closed to prevent the passage of outdoor air through the passage 90. The condenser fans 64 are of course inoperative, and air admitted through the air inlet space 74 is drawn through the opening in which the main outdoor air damper 78 is situated in proportion to the degree of opening of the main outdoor air damper 78. The room air damper 80 is in a position which is inversely related to the position of the main outdoor air damper, due to their common linkage, and the bypass damper 82 has assumed a position fully closing off the face of the evaporator coil 50. Of course, the evaporator coil is inoperative to provide mechanical cooling, and consequently is simply in what may be considered to be a bypass passage with respect to the heating coil 92. With the unit providing full heat to the air passing through coil 92, the room reaches and then exceeds the desired temperature. As this occurs, the bypass damper 82 will begin to modulate toward a position against the face of the heating coil 92.

Figure 9:
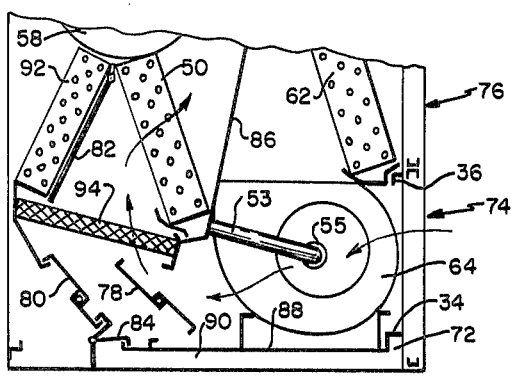
FIGURE 9 is a view like FIG. 8 but showing the dampers in another typical position during winter cycle operation.

If the room temperature continues to increase with the face of the heating coil 92 blocked off by the damper 82 as shown in FIGURE 9, the room air damper 80 and main outdoor air damper 78 will move together toward the position shown in FIGURE 9 in which the room air inlet is completely closed, and the outdoor air damper is in a fully open position. In this damper position the outdoor air provides natural cooling for the room.

Figure 6:
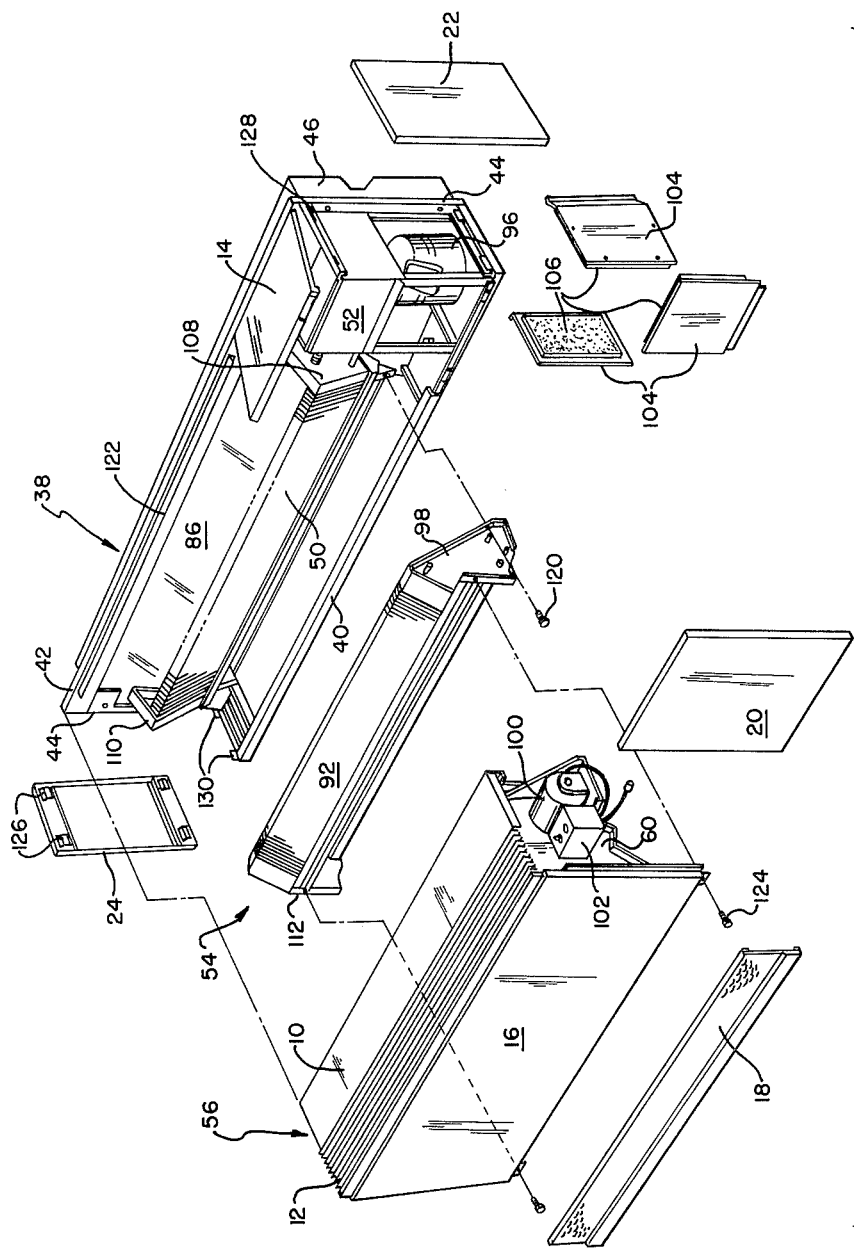
FIGURE 6 is an exploded isometric view from the front side of the unit, showing the front side of the refrigeration section, the heater-damper section, and the room air fans section, along with certain enclosing panels for the exterior of the unit ventilator.

The views of FIGURES 5 and 6 not only illustrate the sectionalized concept in which integral and separable sections are provided, but also illustrate the arrangement which yields the division of the length of the unit into separate parts. Thus the right end of the unit as viewed from the front contains the controls for dampers and the compressor, refrigeration piping, linkages and damper operators, motors for room air fans and condenser air fans, electrical wiring, and other parts of such character. The remaining length in a horizontal direction of the unit ventilator generally contains parts which move, treat, or are associated with air flow.

Specifically, in FIGURE 6 it may be seen that the refrigeration compressor 96 is located below the control compartment 52. The damper shafts to be connected to linkage and operators project through the right end wall 98 with space available beside the control compartment 52 and compressor compartment to accommodate the damper operator and the required linkage (not shown) behind the front wall 20. The right end space of the unit also accommodates the motor 100 for operating the room air fans, and the multi-speed electrical switch box 102 for the room air fan motor, these components being supported from the partition wall 60 of the room air fan section.

The compressor 96 is enclosed within its own individual compartment by the interior panels 104, adapted to cover the two sides and the front of the compressor compartment. On the inner face of each panel 104, sound deadening material 106 is secured to sound insulate the compressor. The rear face of the compressor compartment is open to receive the discharge of compressor compartment ventilating fan 68 (see FIGURE 5) which directs outside air into the compartment and forces it through the compartment to exit through an opening into a space upstream of the condenser 62.

The depthwise-extending wall means separating the length of the unit ventilator into a major air handling part and a remaining control part is made up of partition segments having mating edges. Thus, one dividing wall is generally formed by the partition 108 at the right end of the evaporator 50, the complementally fitting right end wall 98 of the heater-damper section 54, and the right end wall 60 of the room air fan section 56. The edges of these partition walls abut each other to form the substantially continuous partition.

In similar fashion, a relatively smaller space is found at the left end of the unit ventilator outboard of the interfitting partitions 110 at the left end of the evaporator (FIGURE 6), by left end wall 112 of the heater-damper section 54, and a left end wall 60 of the room air fan section. These right and left-hand partition walls form the right and left boundaries, respectively, of the air passage for the conditioned air.

The relatively smaller left end space is provided to accommodate fluid piping connections for the heating coil 92 when it is to be connected to a hot water or steam source. It is noted that heating coil as used herein is used in the broader sense including an electrical resistance heating coil, for example.

With the various sections assembled as described herein, the unit ventilator is divided as noted in a lengthwise direction into one major portion occupying most of the length of the unit ventilator and containing the principal elements for conditioning, moving, and controlling the flow of air to be delivered into the room, and a separate end portion providing space for the compressor compartment and controls. It will be appreciated that by grouping the compressor, most of the refrigeration piping and refrigeration control elements, the room air fan motor 100 and fan control box 102, and the damper actuator and linkage in the end portion space, access to these parts for maintenance and other attention is greatly facilitated.

The sections shown in exploded relation in FIGURES 5 and 6 are secured together by a relatively few fasteners at or near the ends of the sections. Thus, the structure supporting the condenser fans 64 is secured to the rear-facing portion of the refrigeration section (FIGURE 5) by a bolt 114 at each end (only one shown). Two mounting studs 116 projecting forwardly from each end flange 32 of the wall collar section 28 are received through two holes 118 in each end flange 44 of the refrigeration section 28, and a nut and washer (not shown) secure these two sections together. The heater-damper section 54 (FIGURE 6) is secured to the front facing portion of the refrigeration section by a bolt 120 at each end.

The room air fan section 56 is mounted along its rear edge to the refrigeration section by means of a downwardly flanged lip on the rear edge of the main top panel 10. This lip fits into a recess formed between a leg of an angle 122 and the top flange 42 of the refrigeration section. Additionally a bolt 124 at each end of the room air fan section secures the section to flanges on the ends 98 and 112 of the heater-damper section.

The end panels 22 and 24, and control access panel 20, are secured to the chassis 40 of the refrigeration section by friction clips 126 (FIGURE 6) which fit into appropriately located slots 128 and reverse facing clips 130.

Figure 7:
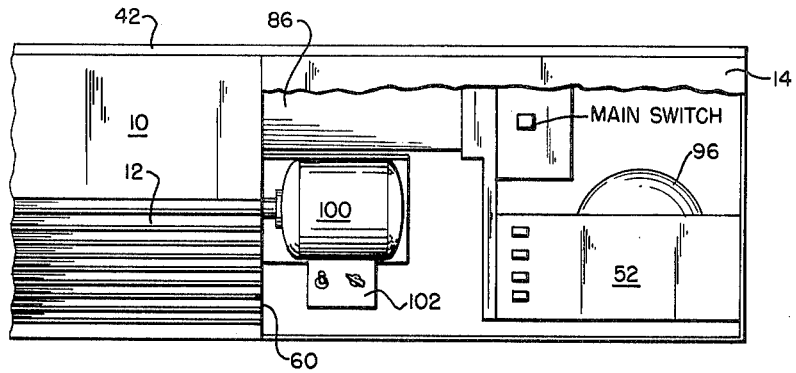
FIGURE 7 is a fragmentary plan view of the end portion of the unit ventilator illustrating the general arrangement of parts therewithin.

In FIGURE 7, the general arrangement of parts and the space available for parts is shown in the plan view of FIGURE 7 wherein the top access panel 14 is broken to expose the space therebelow. The connecting wires between the various elements, and which link these elements to the control box 52, have been deleted for clarity. However, it may be seen that the control box, provided with pushbuttons for selecting various operational cycles, is located in the front right-hand portion of the space, overlying the compressor compartment. The room air fan motor 100 and control box 102 are mounted in the upper part of the space on the partition segment 60, overlying the space in which the damper motor and linkages for controlling the damper means of the heater-damper section are located.

To insure that an appreciation of the advantages attendant the described structure will be appreciated, the following points are considered worthy of emphasis.

First, of course, the requirements earlier stated herein are substantially met by a unit ventilator according to the invention. With structure according to the invention, nearly all optional arrangements connected with operational variations are centered upon the heater-damper section. Specifically, any one of a number of different types of heating coil may be used as a part of the heater-damper section, and any one of a number of different types of damper operation, and damper cycles, may be used with any one heater-damper section.

In those instances where it is desired to provide a device initially operable only as a natural cooling unit ventilator but adapted for later modification to include a refrigeration section, the unit ventilator of this invention lends itself well. A dummy refrigeration section may be provided and later replaced in its entirety with one containing all the necessary refrigeration components. The later change is facilitated since the refrigeration section includes all parts for a complete refrigerating system except the fan means for developing air flow through the evaporator.

The forwardly-inclined condenser disposition avoids a reduction of condenser capacity which is sometimes encountered when a column or other structural support for the building wall must remain in a wall opening location for a unit, and thus blocks off part of the face of an upright condenser.

I claim:
1. A self-contained, air-conditioning unit ventilator for serving an individual room, comprising:
   a series of independent, separable sections securable together to form said unit ventilator;
   said sections including a wall collar section, a refrigeration section, a heater-damper section, and a room air fan section;
   said wall collar section having opposite open faces and a generally rectangular form;
   said refrigeration section including a rear-facing portion carrying a condenser and condenser fans recessable within said collar section, and a front-facing portion carrying an evaporator, said condenser and said evaporator being spaced apart in a depthwise direction and separated by lengthwise-extending partition means;
   said heater-damper section including means mounting it on said front-facing portion of said refrigeration section;
   all of said sections except said collar section including depthwise-extending partition means having complementary, fitting edge portions to generally divide said unit ventilator into a major portion occupying most of the length of said unit ventilator, and a separate end portion containing compressor means and control means.
2. A unit ventilator according to claim 1 in which:
   said heater-damper section includes heating coil means in its upper part and damper means in its lower part; and
   said heating coil means and said evaporator extend for substantially the length of said major portion, form an inverted V in cross section, and extend across alternate flow paths for air passing upwardly from said damper means part.
3. A unit ventilator according to claim 2 in which:
   said damper means includes a room air damper, a main outdoor air damper, an auxiliary outdoor air damper, and a bypass damper;

said main outdoor air damper is disposed to control an opening between said damper means part and the space in said refrigeration section containing said condenser fans; and said auxiliary damper is disposed to control the outlet of a separate outdoor air passage below said condenser fans space.

4. A unit ventilator according to claim 2 in which:

said evaporator and said condenser are both inclined forwardly, and said lengthwise-extending partition means of said refrigeration section is inclined rearwardly to define V-shaped spaces adjacent both the downstream face of said evaporator and the upstream face of said condenser.

5. A unit ventilator according to claim 2 wherein:

said room air fan section includes a series of parallel room air fans disposed generally in an inside corner formed by a top wall panel and a front wall panel; and said room air fans overlie the apex formed by said heating coil and said evaporator.

6. A unit ventilator according to claim 4 including:

a drip pan underlying said evaporator; and means for passing condensate from said drip pan by gravity to said condenser fans.

7. A unit ventilator according to claim 1 in which:

said separate end portion includes means forming a sound-insulated compartment for said compresser means;

fan means are provided for ventilating said compressor compartment with outdoor air; and common means are provided for powering said condenser fans and said compressor compartment ventilating fan means.

8. A self-contained, air-conditioning unit ventilator for serving an individual rooom, comprising:

a generally rectangular wall collar section having generally open front and rear faces, adapted to be disposed in an opening in an exterior wall of said room;

an integral and separate refrigeration section selectively operable to mechanically cool air delivered to said room, including a rear-facing portion having a condenser in the upper part and condenser air fan means in the lower part, said rear-facing portion being recessed into said wall collar section, said refrigeration section further including a front-facing portion including an evaporator thereon;

a heater-damper section, including an upper heating coil and lower damper means, said heater-damper section being mounted on said front-facing portion of said refrigeration section;

a room air fan section including room air fan means for inducing air flow to said unit ventilator and into said room;

means forming a first air passage extending between said outer face of said wall collar section and having an outlet into said heater-damper section;

said damper means of said heater-damper section including:

a room air damper movable to control the admission of room air into said heater-damper section, main outdoor air damper means selectively movable in an opening formed between the space in said refrigeration section containing said condenser fans and said heater-damper section to control the admission of outdoor air therethrough into said heater-damper section, and an auxiliary outdoor air damper selectively movable to control the admission of outdoor air from said first air passage into said heater-damper section.

9. A self-contained, air-conditioning unit ventilator for serving an individual room according to claim 8 in which:

said refrigeration section, said heater-damper section, and said room air fan section all include partition means extending in a depthwise direction to generally divide said unit ventilator into a major portion occupying most of the length of said unit ventilator, and an end portion;

said major portion containing said evaporator, heating coil, room air fans, and damper means; and said end portion containing a refrigerant compressor, and means for operating said dampers and said room air fans.

10. A self-contained, air-conditioning unit for serving an individual room, comprising:

a generally rectangular, open-faced wall collar section for disposition in an opening in a building outside wall;

a refrigeration section including a rear-facing portion recessed in said wall collar section, said rear-facing portion including a set of lower parallel condenser fans and a condenser generally overlying said fans, said refrigeration section further including a front-facing portion carrying an evaporator;

a heater-damper section mounted against said front-facing portion and including a heating coil mounted to form an inverted V with said evaporator, first damper means for controlling the ratio of room air to outdoor air admitted, and second bypass damper means between said heating coil and said evaporator for controlling the proportion of said admitted air directed through each;

and a room air fan section mounted above and on the front of said heater-damper section;

all of said sections except said collar section including depthwise-extending partition means having complementary, fitting edge portions to generally divide said unit ventilator into a major portion occupying most of the length of said unit ventilator, and a separate end portion containing compressor means and control means.

11. A self-contained, air-conditioning unit ventilator of horizontal console character comprising:

a series of separable, independent sections assembled together in interfitting relation to form said unit ventilator, said sections including in a rear-to-front direction, a rectangular wall collar section for mounting in a building outside wall opening, a refrigeration section, a heater-damper section, and a room air fan section;

said refrigeration section including a chassis carrying a refrigerant compressor and controls at one end, a series of parallel condenser fans and an overlying condenser extending substantially the remainder of the length of said refrigeration section along its back side, and a refrigerant evaporator extending substantially for the remainder of the length of said refrigeration section along its front side, said refrigeration section including lengthwise extending wall means between said condenser and said evaporator, said refrigeration section being sized relative to said wall section to permit recessing of said back side of said refrigeration section therewithin;

said heater-damper section including in its upper part a heating coil mounted to form an inverted V with said evaporator and including a bypass damper in said V, and in its lower part room air-outdoor air damper means, said damper section having a length corresponding substantially with the length of said evaporator;

said room air fan section including a series of parallel room air fans extending horizontally above said heating coil and evaporator;

said refrigeration section, said heater-damper section, and said room air fan section including generally vertically-disposed, depthwise-extending partition segments having complementary shaped edges to form a substantially continuous front-to-rear partition dividing said unit ventilator into an end space for a compressor and other operating means, and a remaining substantially longer space containing said dampers, said coil and evaporator.

References Cited by the Examiner

UNITED STATES PATENTS

| | | | |
|---|---|---|---|
| 2,229,304 | 1/1941 | Shurtleff | 165—103 X |
| 2,284,764 | 6/1942 | Parks | 165—16 |
| 2,828,110 | 3/1958 | Baker et al. | 165—16 |
| 3,018,088 | 1/1962 | Allander et al. | 165—103 |
| 3,129,753 | 4/1964 | Davis et al. | 165—16 X |
| 3,139,020 | 6/1964 | Schemenauer | 165—16 X |

ROBERT A. O'LEARY, *Primary Examiner.*

M. A. ANTONAKAS, *Assistant Examiner.*